(12) United States Patent
Theisen et al.

(10) Patent No.: US 7,065,182 B1
(45) Date of Patent: Jun. 20, 2006

(54) VOICE MAIL MESSAGE REPOSITIONING DEVICE

(75) Inventors: Erik M. Theisen, Suwanee, GA (US); Christopher J. LaVelle, Duluth, GA (US)

(73) Assignee: Glenayre Electronics, Inc., Charlotte, NC (US)

( * ) Notice: Subject to any disclaimer, the term of this patent is extended or adjusted under 35 U.S.C. 154(b) by 793 days.

(21) Appl. No.: 09/636,108

(22) Filed: Aug. 10, 2000

(51) Int. Cl.
*H04M 1/64* (2006.01)

(52) U.S. Cl. .................................. 379/67.1; 379/88.22

(58) Field of Classification Search ............ 379/88.18, 379/88.22, 88.23, 88.24; 455/412, 569, 413, 455/415, 462
See application file for complete search history.

(56) References Cited

U.S. PATENT DOCUMENTS

| | | | | |
|---|---|---|---|---|
| 4,309,571 A | * | 1/1982 | Chamberlin | 379/75 |
| 5,406,618 A | * | 4/1995 | Knuth et al. | 379/373.01 |
| 5,533,102 A | * | 7/1996 | Robinson et al. | 379/88.25 |
| 5,568,540 A | * | 10/1996 | Greco et al. | 379/88.11 |
| 5,784,436 A | * | 7/1998 | Rosen et al. | 379/88.28 |
| 5,845,240 A | * | 12/1998 | Fielder | 360/48 |
| 5,953,656 A | * | 9/1999 | Bertocci | 455/412.2 |
| 5,970,447 A | * | 10/1999 | Ireton | 704/213 |
| 6,232,887 B1 | * | 5/2001 | Carson | 340/431 |
| 6,404,856 B1 | * | 6/2002 | Wilcox et al. | 379/67.1 |
| 6,408,068 B1 | * | 6/2002 | Larson et al. | 379/357.01 |

OTHER PUBLICATIONS 847107687-11, 1993, AT&T Answering System Owner Manual p. 13 1721.*

* cited by examiner

*Primary Examiner*—Fan Tsang
*Assistant Examiner*—Ming Chow
(74) *Attorney, Agent, or Firm*—Christensen O'Connor Johnson Kindness PLLC

(57) ABSTRACT

A voice message repositioning process is provided for a voice message system that stores voice messages for a user of the system and provides feedback to the user of the progress of repositioning the playback of a voice message. A voice message is repositioned upon receipt of a command to begin repositioning. Feedback is provided to the user via a supervisory signal during repositioning. The repositioning is stopped upon receipt of a command by the user to stop repositioning.

12 Claims, 3 Drawing Sheets

VOICE MAIL MESSAGE REPOSITIONING DEVICE

FIELD OF THE INVENTION

The present invention generally relates to voice mail systems. More specifically, the present invention relates to a voice mail system and method for repositioning voice messages.

BACKGROUND OF THE INVENTION

A conventional voice mail system stores voice messages for retrieval and playback by a telephone user or subscriber. Most of these systems have fast-forward and rewind features for skipping or re-playing selected portions of the message during playback. To enable either of these repositioning functions, the user typically presses a specialized key on the voice mail instrument, thereby "moving" the message by some arbitrary amount.

In some systems, this key press triggers only a few seconds of repositioning. Thus, in order to reach the desired point in the message, a user may need to press the key multiple times in succession. This method of repositioning is repetitious and highly inefficient.

This problem has been solved partially in other systems by holding down the key press so that the repositioning continues for as long as the key is held down. As soon as the user releases the key, playback resumes from the repositioned point. However, because it can be difficult to gauge the progress of repositioning while it is occurring, the user may tend to stop the repositioning prematurely. Therefore, even in these systems, a user typically needs to invoke the repositioning multiple times before reaching the desired point in the message for playback of the message.

These existing repositioning methods are even more cumbersome in a voice navigation environment. Voice navigation requires a person to issue commands by speaking to the system. Thus, the repeated issue of the same commands to reposition a message can be extremely slow and annoying to the user. Also, because the system may take longer to process voice commands than digital commands, the issuance of multiple voice commands in succession may slow down the system's performance.

Therefore, there is a need for a repositioning system that operates more efficiently, provides better feedback to the user of the progress of repositioning the playback of a voice message, minimizes the need for a user to repeatedly issue commands to reposition a message, and is better adapted for use in voice navigation environments.

Further advantages of the present invention will become apparent from a consideration of the drawings and ensuing description.

SUMMARY OF THE INVENTION

The present invention provides a voice message repositioning process for a voice message system that stores voice messages for a user of the system and provides feedback to the user of the progress of repositioning the playback of a voice message. A voice message is repositioned upon receipt of a command to begin repositioning. Feedback is provided to the user via supervisory signals during repositioning. These signals may be, for example, audio, visual, such as flashing lights, or vibratory, such that the unit vibrates to alert the user.

The supervisory signals may operate at fixed intervals. When the signals operate at fixed intervals, the same amount of time elapses between the signals. The invention may also operate at variable intervals. For instance, the invention may adjust the intervals and have the intervals be based on the length or size of the message or the position in the message. For example, for a large size message, the intervals may be longer in duration, whereas for a small size message, the intervals may be shorter in duration. Further, where the repositioning has begun at approximately the beginning of a message, the intervals may be longer in duration and gradually shorten in duration as the repositioning approaches the end of the message. The repositioning is stopped upon receipt of a command to stop repositioning.

The present invention reduces the burden on a user or subscriber because it minimizes the need for a user to repeatedly issue commands to reposition a message. By providing signal based feedback during repositioning, the invention enables the user to better gauge the progress of the repositioning and therefore locate the desired position in the message for playback. Further, the present invention is better adapted for use in voice navigation environments. In voice navigation, it is desirable to have fewer command issuances because the system typically takes longer to process and respond to voice commands than to digital or keyed commands.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
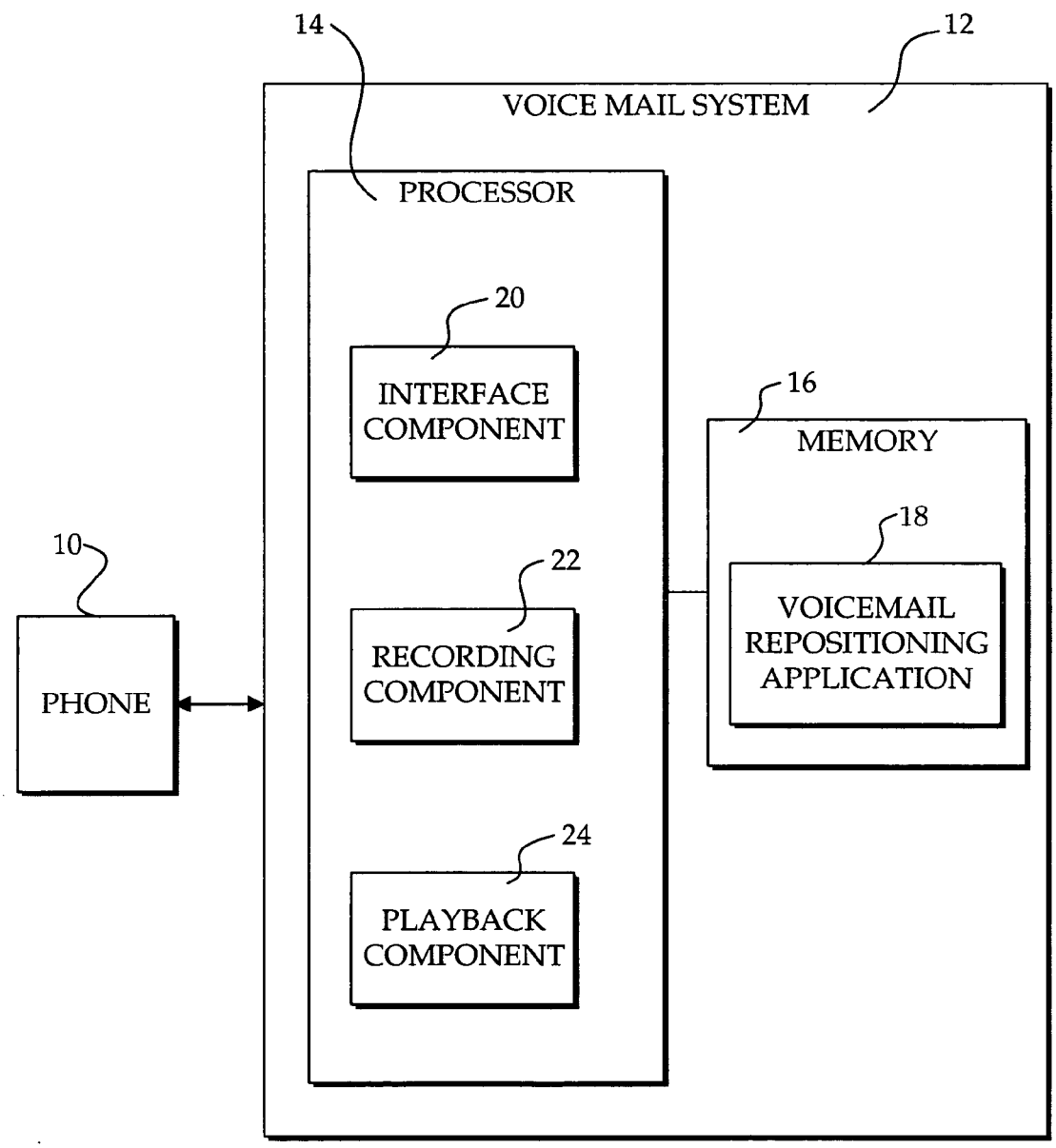
FIG. 1 shows a block diagram of a voice mail repositioning system according to one embodiment of the present invention.

Before describing, in detail, the particular voice mail repositioning system in accordance with the present invention, it should be observed that the invention resides primarily in a structural combination of conventional data/signal processing components and communication circuits, and not in the particular detailed configurations thereof. Accordingly, the structure, control and arrangement of these conventional components have, for the most part, been illustrated in the Drawings by readily understandable block diagrams, which show only those specific details that are pertinent to the present invention. Thus, for example, communication busses and power supply terminals and leads have been omitted for clarity. In addition, various electronic data processing portions of the voice mail system have been appropriately consolidated and simplified into basic components in order to emphasize those components that are most pertinent to the invention. Thus, the block diagram illustrations of the FIG. 1 do not necessarily represent the mechanical structural arrangement of the exemplary system, but are primarily intended to illustrate the major structural components of the system in a convenient functional grouping in which the present invention resides, whereby the invention may be more readily understood.

The present invention is a voice mail repositioning system whereby by providing feedback to the user of the progress of repositioning the playback of a voice message, the user can better gauge the progress of repositioning and therefore quickly locate the desired location in the message. The invention minimizing the need for repetitious commands from the user and thus makes the system better suited for navigation. The present invention can be applied to speech recognition environments as well as to conventional voice mail dual tone multifrequency (DTMF) systems.

FIG. 1 shows a simplified block diagram of a voice mail system 12 according to one embodiment of the present invention. The voice mail system 12 is adapted to communicate with a phone 10 and, as shown in FIG. 1, is accordingly connected to phone 10. The voice mail system 12 comprises a processor 14, a memory 16 coupled to the processor 14, and communication bus components (not shown) for controlling the operation of the voice mail system 12. As mentioned previously, each of the components employed in the present invention is well known, so that no detailed description thereof need be supplied here.

Memory 16 stores digitized incoming voice messages for later playback, message envelopes, and a voice mail repositioning application 18. The processor 14 comprises an interface component 20, a recording component 22, and a playback component 24. The processor 14 may be a special-purpose CPU used for digital signal processing. The circuitry that make up these components are conventional and need not be described here for an understanding of the invention. The interface component 20 controls the transmission of signals to and from a user of the system 12. These signals can be analog or digital signals. For example, the system 12 can send voice messages prompting the user to select a function. The user, via the phone 10, can send a voice message to be stored in the system 12 or the user can send voice or digital key commands directing the system 12 to perform certain functions, such as instructing the system 12 to fast forward or rewind through voice messages.

The recording and playback components 22 and 24 of the processor 14 are adapted to record, retrieve and playback voice messages. Playback includes message repositioning functions such as fast-forwarding and rewinding through voice messages such that audio cues, for example, are provided to give feedback to the user of the progress of the repositioning. During playback, the interface component 20 may receive a user request to commence repositioning. Upon receipt of such a request, the processor 14 accesses memory 16 to retrieve and execute the voice mail repositioning application 18 stored in memory 16. The voice mail repositioning application 18 contains logic which directs the processor 14 to provide supervisory signals the user during the repositioning process, as described in more detail below.

Figure 2:
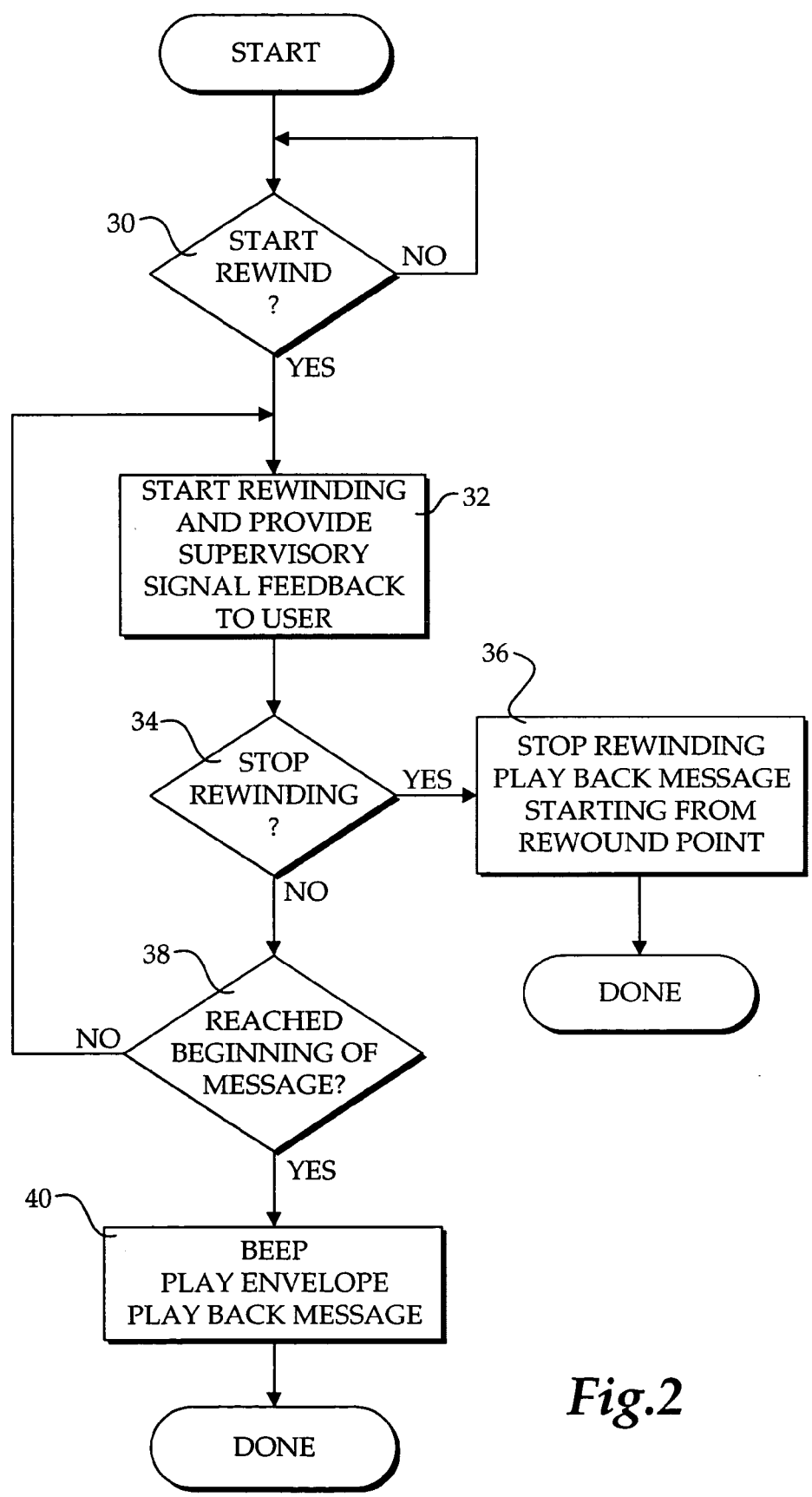
FIG. 2 shows a flow diagram showing the steps of a rewinding method for voice messages according to one embodiment of the present invention.

FIG. 2 shows a flow chart illustrating the steps of a rewinding method through a voice message according to one embodiment of the present invention. Beginning at a step 30, a test is made to determine if a start rewind command has been received from a user. The user can issue the start rewind command with either a voice command or by pushing a key or some other mechanism on the telephone. If a start rewind command has not been received, the system continues to check for one as shown in FIG. 2. On the other hand, if a start rewind command has been received, the system proceeds to a step 32 and begins the "repositioning effect." The system begins rewinding through the message and repositions the message in some fixed or arbitrary sized decrements, at an accelerated time rate. Each voice block decrement results in a supervisory signal being played back to the user so that the user is informed of the progress of the rewind. These signals may be, for example, audio, visual, such as flashing lights, or vibratory, such that the unit vibrates to alert the user.

The supervisory signals may operate at fixed intervals. When the signals operate at fixed intervals, the same amount of time lapses between the signals. The invention may also operate at variable intervals. For instance, the invention may adjust the intervals and have the intervals be based on the length or size of the message or the position in the message. For example, for a large size message, the intervals may be longer in duration, whereas for a small size message, the intervals may be shorter in duration. Further, where the repositioning has begun at approximately the beginning of a message, the intervals may be longer in duration and gradually shorten in duration as the repositioning approaches the end of the message.

Concurrently with a step 32, steps 34 and 38 are occurring. Once the user feels that the message has been rewound far enough, based on the supervisory signals, the user either presses a key on the telephone or provides a voice command to stop the rewind or the message is fully rewound. At step 34, the system tests for receipt of a stop rewind command. If no stop rewind command has been received, the system continues to make this query. Otherwise, if a stop rewind command has been received, the system, at a step 36, stops the rewinding and plays the message starting from the rewound point. At a step 38, the system tests if the beginning of the message has been reached. If the beginning of the message has not been reached, the system continues to make this query. Otherwise, if the beginning of the message has been reached, the system proceeds to a step 40 wherein the system provides a distinct beep, or some other indication to inform the user that the repositioning effect has automatically ended. The system then plays the message envelope followed by the entire message to provide some message context information to cue the user on what to do next. The message envelope stores general information about the message such as the date and time the message was recorded.

Figure 3:
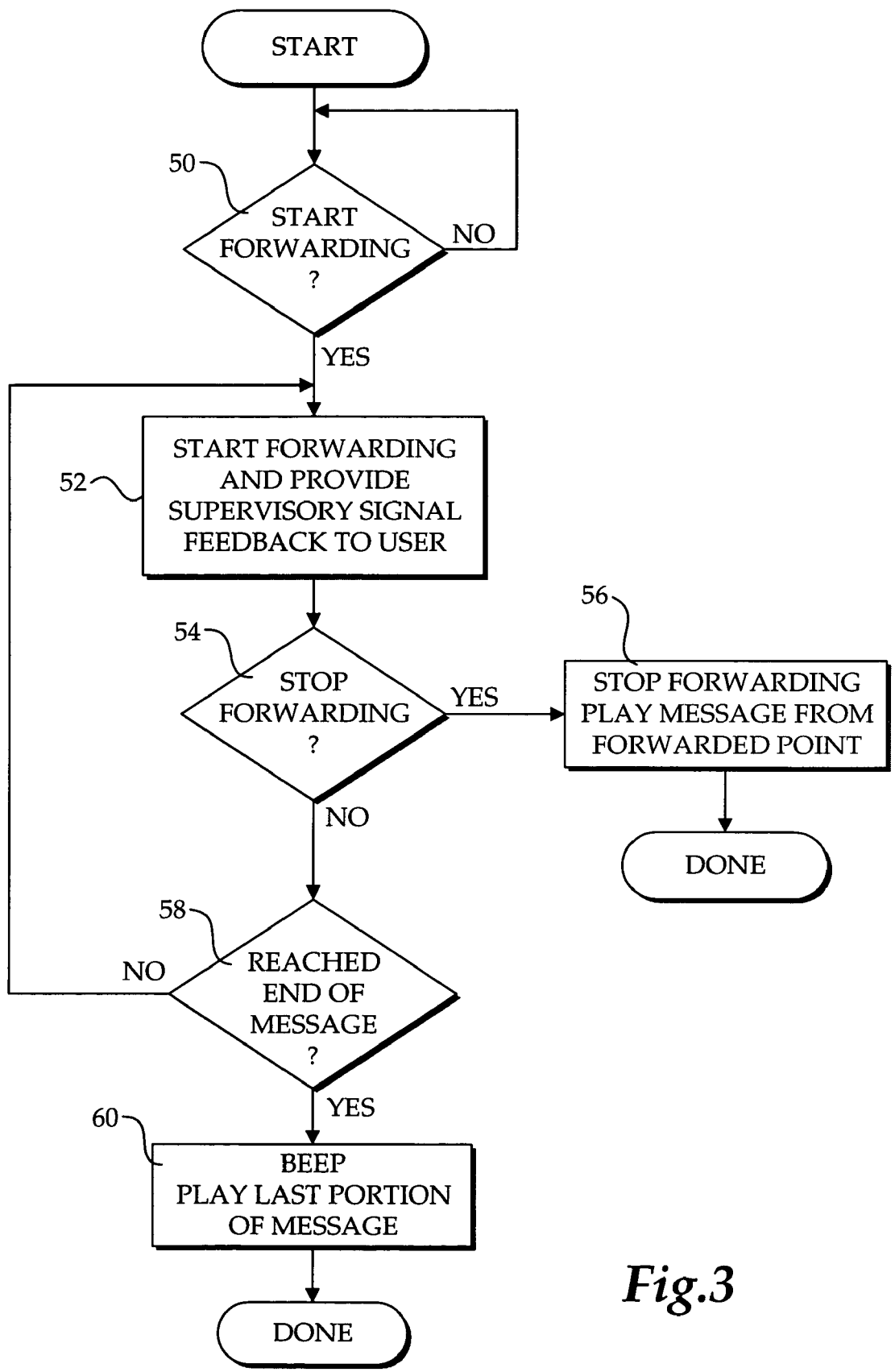
FIG. 3 shows a flow diagram showing the steps of a fast-forwarding method for voice messages according to one embodiment of the present invention.

FIG. 3 shows a flow chart illustrating the steps of a fast-forwarding method according to one embodiment of the present invention. The steps are similar to those in FIG. 2 with a few exceptions. First, the repositioning is fast-forwarding rather than rewinding the message. Second, at a step 54, the system tests for receipt of a stop forwarding command. If no stop forwarding command has been received, the system continues to make this query. Otherwise, if such a command has been received, the system proceeds to a step 56, wherein the system stops the fast forwarding and plays the message from the fast forwarded point. Third, at a step 58, which occurs concurrently with step 54, the system tests to see if the end of the message has been reached. If the end of the message has not been reached, the system continues to make this query. If the end of the message has been reached, the system proceeds to a step 60 wherein the system provides a distinct beep or some other indication and plays the last portion of the message to provide the user with some message context information to cue the user on what to do next.

As will be readily appreciated by those skilled in the art and others, a voice mail system in which the present invention is implemented has a number of advantages. First, by providing supervisory signal feedback during repositioning, the present invention enables the user to better gauge the progress of the repositioning for playback of a voice message, thereby reducing the chances that the user will need to reposition again. Second, the present invention makes voice mail systems better suited for voice navigation environments. In voice navigation, it is desirable to have fewer command issuances because it typically takes a system and the user longer to process and respond to voice commands than to digital or keyed commands.

In the foregoing specification, the invention has been described with reference to the preferred embodiment thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

The invention claimed is:

1. A voice message repositioning method for a voice message system that stores voice messages for a user of the system and provides feedback to the user regarding the progress of repositioning the playback of a voice message, the repositioning method comprising the steps of:
    (a) repositioning the voice message upon receipt of a start command to begin repositioning, wherein the start command is communicated from a telephone to the voice message system;
    (b) providing feedback to the user via a supervisory signal during repositioning, wherein the supervisory signal is a vibratory signal; and
    (c) stopping the repositioning upon receipt of a stop command initiated by the user to stop the repositioning, wherein the stop command is communicated from the telephone to the voice message system.

2. A voice message repositioning method for a voice message system that stores voice messages for a user of the system and provides feedback to the user regarding the progress of repositioning the playback of a voice message, the repositioning method comprising the steps of:
    (a) repositioning the voice message upon receipt of a start command to begin repositioning, wherein the start command is communicated from a telephone to the voice message system;
    (b) providing feedback to the user via a supervisory signal during repositioning, wherein the supervisory signal operates at variable intervals; and
    (c) stopping the repositioning upon receipt of a stop command initiated by the user to stop the repositioning, wherein the stop command is communicated from the telephone to the voice message system.

3. The method of claim 2, wherein the variable intervals are based on the length of the voice message.

4. The method of claim 2, wherein the variable intervals are based on the position in the voice message.

5. A voice message repositioning method for a voice message system that stores voice messages for a user of the system and provides feedback to the user regarding the progress of repositioning the playback of a voice message, the repositioning method comprising the steps of:
    (a) repositioning the voice message upon receipt of a start command to begin repositioning, wherein the start command is communicated from a telephone to the voice message system, and wherein the repositioning comprises rewinding;
    (b) providing feedback to the user via a supervisory signal during repositioning; and
    (c) stopping the repositioning substantially at the beginning of the message and playing a message envelope before playing the message from the beginning, wherein stopping the repositioning occurs upon receipt of a stop command initiated by the user and wherein the stop command is communicated from the telephone to the voice message system.

6. The method of claim 5, further comprising the steps of providing a signal indicating that the beginning of the message has been reached.

7. A voice message repositioning system that stores voice messages for a user of the system and provides feedback to the user regarding the progress of repositioning the playback of a voice message, the system comprising:
    (a) a processor; and
    (b) a memory coupled to the processor, the memory storing program code implemented by the processor for:
        (i) repositioning the voice message upon receipt of a start command to begin repositioning, wherein the system is adapted for receiving the start command from a telephone;
        (ii) providing feedback to the user via a supervisory signal during repositioning, wherein the supervisory signal is a vibratory signal; and
        (iii) stopping the repositioning upon receipt of a command by the user to stop repositioning, wherein the system is adapted for receiving the stop command from the telephone.

8. A voice message repositioning system that stores voice messages for a user of the system and provides feedback to the user regarding the progress of repositioning the playback of a voice message, the system comprising:
    (a) a processor; and
    (b) a memory coupled to the processor, the memory storing program code implemented by the processor for:
        (i) repositioning the voice message upon receipt of a start command to begin repositioning, wherein the system is adapted for receiving the start command from a telephone;
        (ii) providing feedback to the user via a supervisory signal during repositioning, wherein the supervisory signal operates at variable intervals; and
        (iii) stopping the repositioning upon receipt of a command by the user to stop repositioning, wherein the system is adapted for receiving the stop command from the telephone.

9. The voice message repositioning system of claim 8, wherein the variable intervals are based on the length of the voice message.

10. The voice message repositioning system of claim 8, wherein the variable intervals are based on the position in the voice message.

11. A voice message repositioning system that stores voice messages for a user of the system and provides feedback to the user regarding the progress of repositioning the playback of a voice message, the system comprising:
    (a) a processor; and
    (b) a memory coupled to the processor, the memory storing program code implemented by the processor for:
        (i) repositioning the voice message upon receipt of a start command to begin repositioning, wherein the system is adapted for receiving the start command from a telephone, and wherein the repositioning comprises rewinding;

(ii) providing feedback to the user via a supervisory signal during repositioning; and (iii) stopping the repositioning substantially at the beginning of the message and playing a message envelope before playing the message from the beginning, wherein stopping the repositioning occurs upon receipt of a command by the user to stop repositioning and wherein the system is adapted for receiving the stop command from the telephone.

12. The voice message repositioning system of claim 11, wherein the program code when executed by the processor further provides a signal indicating that the beginning of the message has been reached.

* * * * *

UNITED STATES PATENT AND TRADEMARK OFFICE
CERTIFICATE OF CORRECTION

PATENT NO. : 7,065,182 B1  
APPLICATION NO. : 09/636108  
DATED : June 20, 2006  
INVENTOR(S) : E.M Theisen et al.

It is certified that error appears in the above-identified patent and that said Letters Patent is hereby corrected as shown below:

On the Title Page  
Item (56)  Refs. Cited  insert in appropriate order  
Pg. 1, col. 1  (U.S. Pats.)

| | | |
|---|---|---|
| --4,785,473 | 11/1988 | Pfeiffer et al. |
| 4,821,311 | 4/1989 | Hashimoto |
| 5,153,579 | 10/1992 | Fisch et al. |
| 5,278,896 | 1/1994 | Sakata et al. |
| 5,406,618 | 4/1995 | Knuth et al. |
| 5,454,036 | 9/19965 | Gleeman et al. |
| 5,519,765 | 5/1996 | Sonoda et al. |
| 5,568,539 | 10/1996 | Bergsman et al. |
| 5,579,377 | 11/1996 | Rogers |
| 5,664,060 | 9/1997 | Jarrett et al. |
| 5,717,742 | 2/1998 | Hyde-Thomson |
| 5,765,129 | 6/1998 | Hyman et al. |
| 5,768,349 | 6/1998 | Knuth et al. |
| 5,797,124 | 8/1998 | Walsh et al. |
| 5,822,405 | 10/1998 | Astarabadi |
| 5,826,187 | 10/1998 | Core et al. |
| 5,828,995 | 10/1998 | Satymurti et al. |
| 5,848,130 | 12/1998 | Rochkind |
| 5,852,803 | 12/199 | Ashby III et al. |
| 5,867,793 | 2/19998 | Davis-- |

On the Title Page  
Item (56)  Refs. Cited  
Pg. 1, col. 2  (Other Publs.,)  "847107687-11" should read --847107687-I1--

Signed and Sealed this

Twenty-eighth Day of August, 2007

JON W. DUDAS  
*Director of the United States Patent and Trademark Office*